United States Patent
Sulzer et al.

(10) Patent No.: US 12,529,210 B1
(45) Date of Patent: Jan. 20, 2026

(54) POSITION-BASED HYDRAULIC FUNCTION PRIORITY

(71) Applicant: Deere & Company, Moline, IL (US)

(72) Inventors: Bryan D. Sulzer, Dubuque, IA (US); Jeffrey W. Dobchuk, Saskatoon (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/776,754

(22) Filed: Jul. 18, 2024

(51) Int. Cl.
  *E02F 9/22* (2006.01)
  *E02F 9/20* (2006.01)

(52) U.S. Cl.
  CPC .......... *E02F 9/2221* (2013.01); *E02F 9/2025* (2013.01); *E02F 9/2292* (2013.01)

(58) Field of Classification Search
  CPC ...... E02F 9/2029; E02F 9/2221; E02F 9/2025
  See application file for complete search history.

(56) References Cited

U.S. PATENT DOCUMENTS

| | | | |
|---|---|---|---|
| 4,838,756 A | 6/1989 | Johnson et al. | |
| 9,334,629 B2 | 5/2016 | Mueller | |
| 9,435,105 B2 | 9/2016 | Fleischmann et al. | |
| 11,180,904 B2 | 11/2021 | Jones et al. | |
| 11,639,594 B2 | 5/2023 | McKinzie | |
| 11,713,775 B2 | 8/2023 | Maro et al. | |
| 2018/0373275 A1* | 12/2018 | Beschorner | G01S 17/86 |

FOREIGN PATENT DOCUMENTS

| | | | | |
|---|---|---|---|---|
| JP | 6942532 B2 | * | 9/2021 | ............... E02F 3/32 |
| JP | 2023117113 A | * | 8/2023 | |
| WO | WO-2018235779 A1 | * | 12/2018 | ............... E02F 3/32 |

* cited by examiner

Primary Examiner — Abiy Teka
(74) Attorney, Agent, or Firm — Tucker Ellis LLP; Patrick F. Clunk

(57) ABSTRACT

One or more techniques and/or systems are disclosed for providing hydraulic fluid of a hydraulic system of a work vehicle to one or more fluid demand subsystems, thereby prioritizing the output of one or more actuators associated with the one or more fluid demand subsystems. A control system of the work vehicle may comprise an operator input system, a sensor array, and a controller is configured to determine an operation mode of the work vehicle based at least upon the state of the work vehicle and an input command. The control system may be further configured to generate a modified command based on the determined operation mode, the input command, and specifications of the work vehicle. The modified command may then used to provide hydraulic fluid to a fluid demand subsystem and drive movement of movable elements of the work vehicle.

20 Claims, 5 Drawing Sheets

POSITION-BASED HYDRAULIC FUNCTION PRIORITY

BACKGROUND

Construction vehicles such as excavators and related agricultural or work vehicles utilize hydraulic systems to efficiently perform otherwise burdensome tasks, such as lifting heavy loads, earthmoving, digging, demolishing existing structures and infrastructure, etc. To perform tasks, the work vehicle distributes hydraulic fluid through the hydraulics system to an actuator configured to drive movement of a movable element of the work vehicle. Hydraulic system control designs attempt to prioritize the fluid flow available to execute intended operations for all potential activities. That prioritization, which is a general prioritization for the system as a whole, may cause less-than-optimal trade-offs when the goals of the system are not uniform for all tasks. Thus, a system for achieving focused hydraulic function prioritization within the limits of a fixed physical hydraulic system is desirable. In one implementation, such prioritizations can be achieved by using position and motion data to determine operator intent, and by using electrohydraulic control to manage hydraulic fluid flow sharing.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for utilizing position and movement data of movable elements of a work vehicle to prioritize hydraulic fluid flow sharing and improve hydraulic function of the work vehicle.

In one implementation, a control system for optimizing performance of a hydraulic system of a work vehicle may comprise a plurality of fluid demand subsystems of the hydraulic system and a controller. The plurality of fluid demand subsystems may be configured to receive hydraulic fluid during operation of the hydraulic system, and each fluid demand subsystem may comprise an actuator configured to drive movement of a movable element of the work vehicle.

In another implementation, the controller may be configured to receive location data of the movable element, velocity data of the movable element, and an input command to move the movable element along a trajectory-of-action. The controller may comprise a processor for processing data and instructions, and memory comprising stored instructions.

In another implementation, the stored instructions, when executed by the processor, may be configured to locate the movable element based on the location data, determine a velocity of the movable element based on the velocity data, and determine an operation mode based at least upon the location of the movable element, the velocity of the movable element, and the input command. The stored instructions may be further configured to generate a modified command based at least upon a work vehicle specification and the determined operation mode, and, selectively provide hydraulic fluid flow to one or more of the plurality of fluid demand subsystems based at least upon the modified command to prioritize output of one or more actuators corresponding to the one or more fluid demand subsystems and drive movement of the movable element along the trajectory-of-action.

In yet another implementation, the hydraulic system may comprise a plurality of actuators each configured to drive movement of a movable element of a plurality of movable elements of the work vehicle, a plurality of valves each corresponding to at least one actuator, and a plurality of pumps each operably coupled to at least one actuator of the plurality of actuators to controllably provide hydraulic fluid under pressure to the at least one actuator through each corresponding valve of the plurality of valves.

In another implementation, the hydraulic system of the control system may further comprise a first fluid demand subsystem comprising a first actuator, a second fluid demand subsystem comprising a second actuator, and a third fluid demand subsystem comprising the first actuator.

In yet another implementation, the control system may be further configured to selectively provide hydraulic fluid flow based on a first modified command, resulting in a first valve of the plurality of valves being open and a second valve of the plurality of valves being closed such that hydraulic fluid may be provided to a first fluid demand subsystem. The control system may be even further configured to selectively provide hydraulic fluid flow based on a second modified command resulting in the first valve of the plurality of valves being closed and the second valve of the plurality of valves being open such that hydraulic fluid may be provided to a second fluid demand subsystem.

In another implementation, the stored instructions, when executed by the processor, may be configured to select a fluid demand subsystem of the plurality of fluid demand subsystems. The selected fluid demand subsystem may comprise an actuator of the plurality of actuators corresponding to a moveable element of the vehicle being commanded to be moved along the trajectory-of-action based on the input command.

In a further implementation, a cycle time of the actuator of the selected fluid demand subsystem, upon the selected fluid demand subsystem being provided hydraulic fluid based on the modified command, may be less than a cycle time of the actuator upon being engaged based on the input command.

In another implementation, the controller may be further configured to receive location data of a plurality of movable elements of the work vehicle, and velocity data of the plurality of movable elements. The stored instructions, when executed by the processor may be further configured to locate the plurality of movable elements based on the location data, determine a velocity of each of the plurality of movable elements based on the velocity data, and determine an operation mode based at least upon the location of each of the plurality of movable elements, the velocity of each of the plurality of movable elements, and the input command.

In yet another implementation, the work vehicle specification may comprise one or more of a hydraulic fluid volume of the hydraulic system, an actuation amplitude of each of the plurality of actuators, output parameters of each of the plurality of pumps, and engine speed limits of the engine of the work vehicle.

In another implementation, the controller may be further configured to receive state data. The state data may comprise one or more of pressure data of the hydraulic system proximate the movable element, temperature data of the hydraulic system proximate the movable element, and load data of the work vehicle proximate the movable element. The stored instructions, when executed by the processor, may be further configured to determine a state of the work vehicle based on the state data. The operation mode may be determined based at least upon the state of the work vehicle, the location of the movable element, the velocity of the movable element, and the input command.

In a further implementation, the work vehicle may be an excavator.

In yet another implementation, the determined operation mode may comprise one or more of an exit mode, a cut mode, a swing mode, a Cartesian mode, a transport mode, a grading mode, and an attachment mode.

In another implementation, the control system may further comprise a sensor array configured to generate location data of the movable element and velocity data of the movable element, and may be further configured to send the location data and the velocity data to the controller.

In a further implementation, the sensor array may comprise one or more of kinematic sensors, inertial measurement units, linear displacement transducers, Hall effect sensors, rotation sensors, accelerometers, optical sensors, laser-based sensors, hydraulic pressure sensors, and hydraulic flow meters.

In yet another implementation, the control system may further comprise an operator input system configured to generate the input command based on operator input. The operator input system may comprise one or more of a graphical user interface, a lever, a joystick, and a pedal.

In another implementation, a method of controlling a hydraulic system of a work vehicle may comprise locating a movable element of the work vehicle, determining a velocity of the movable element along a trajectory-of-action, receiving an input command to move the movable element along a trajectory-of-action, determining an operation mode based at least upon the location of the movable element, the velocity of the movable element, and the input command, accessing a work vehicle specification, modifying the input command according to the work vehicle specification and the operation mode, and using the modified command to provide hydraulic fluid flow to a fluid demand subsystem of the hydraulic system and drive movement of the movable element along the trajectory-of-action.

In yet another implementation, a work vehicle may comprise a frame, a plurality of movable elements mounted to the frame, and a hydraulic system. The hydraulic system may comprise a plurality of actuators configured to drive movement of the plurality of movable elements, a plurality of valves each corresponding to at least one actuator of the plurality of actuators, a plurality of pumps each operably coupled to at least one actuator of the plurality of actuators to controllably provide hydraulic fluid under pressure to the actuator through the corresponding valve, and a plurality of fluid demand subsystems each configured to receive hydraulic fluid during operation of the hydraulic system, wherein each fluid demand subsystem comprises an actuator of the plurality of actuators.

In another implementation, the work vehicle may further comprise a sensor array configured to collect location data of the plurality of movable elements and velocity data of the plurality of movable elements, an operator input system configured to receive an input command to move a moveable element of the plurality of movable elements along a trajectory-of-action, and a controller in communication with the hydraulic system, the sensor array, and the operator input system. The controller may be configured to locate the moveable element of the plurality of movable elements based on the location data, determine a velocity of the moveable element of the plurality of movable elements based on the velocity data, determine an operation mode according to the location and the velocity of the moveable element of the plurality of movable elements, and the input command, and generate a modified command according to a specification of the work vehicle and the determined operation mode. The controller may be further configured to selectively provide hydraulic fluid flow to one or more of the plurality of fluid demand subsystems based at least upon the modified command to prioritize output of one or more of the plurality of actuators of the one or more prioritized fluid demand subsystems, and drive movement of the movable element along the trajectory-of-action.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
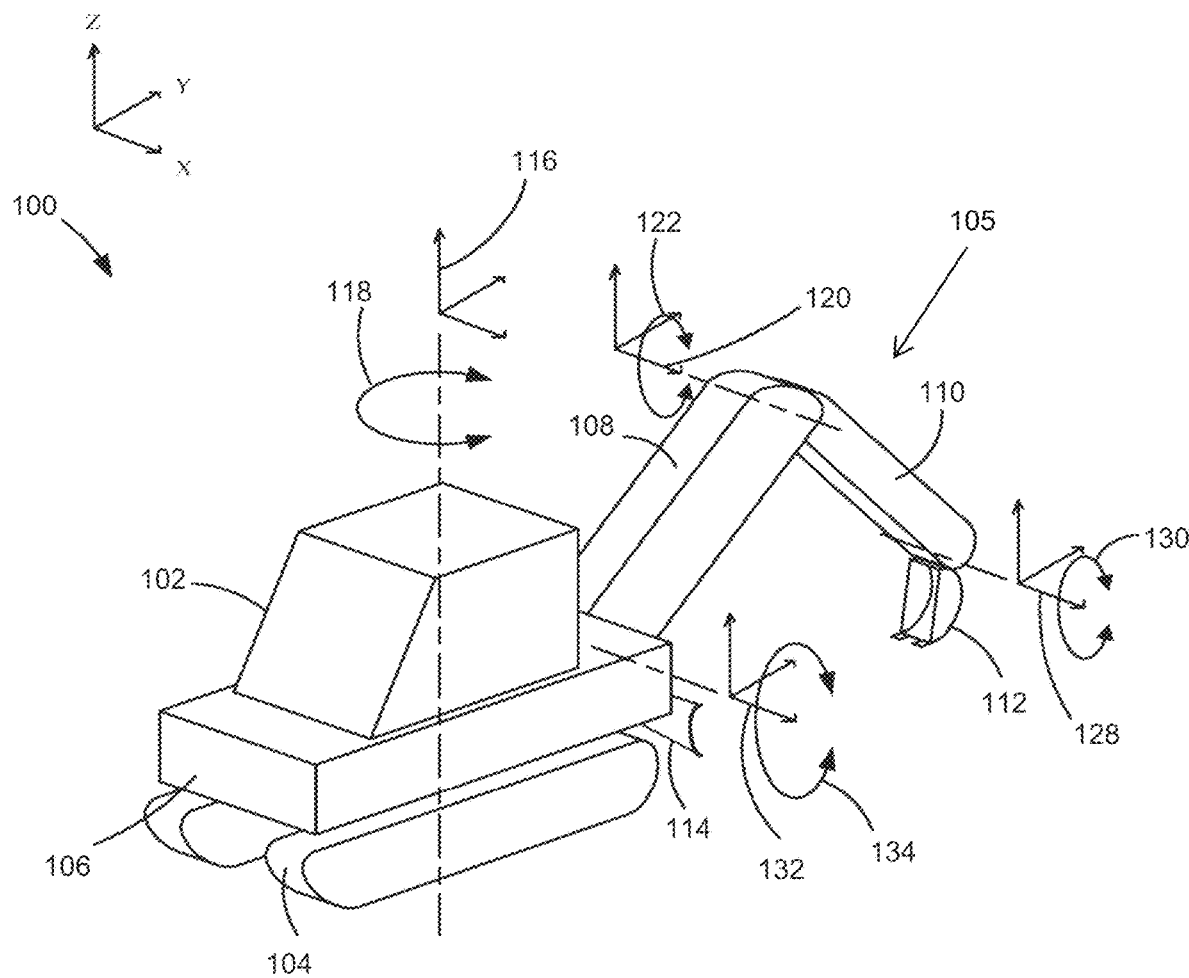
FIG. 1 is a perspective view of an exemplary work vehicle.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different construction vehicles such as excavators and related agricultural or work vehicles that utilize hydraulic systems to perform tasks. That is, the herein disclosed examples can be implemented in different work vehicles other than excavators for lifting heavy loads, earthmoving, digging, demolishing, etc.

An example work vehicle 100 having a hydraulic system 200 for performing tasks is shown in FIG. 1. The work vehicle 100 is operated either autonomously or by an operator located in an operator compartment 102 by means of a control system 300. The work vehicle 100 can include a variety of different controllable subsystems, some of which comprise movable elements 105 and corresponding actuators 201 to actuate the movable elements 105. In the example shown in FIG. 1, the movable elements 105 of the controllable subsystems include at least tracks 104, a cab 106, a boom 108, an arm 110, an attachment 112, and a blade 114.

Each of the movable elements 105 is driven by one or more corresponding actuators 201 (such as hydraulic cylinders, or other actuators). Tracks 104 are mounted to a lower frame of the work vehicle 100 and are driven by an engine or motors of the work vehicle 100 to guide and propel the work vehicle 100 about a worksite. In other examples, tracks 104 can be replaced by wheels or other ground engaging elements.

The operator compartment 102 is coupled to the cab 106 where internal components of the work vehicle 100 are housed. Some of these internal components include an engine, transmission, hydraulic pumps, generators, etc. The cab 106 is supported by an upper frame and rotatably coupled relative to the lower frame of the work vehicle 100. The cab 106 is driven by an actuator to rotate about a cab axis 116 in the direction indicated by cab arrows 118.

The boom 108 is also rotatably coupled to the upper frame of the cab 106. The boom 108 rotates about a boom axis 120 in the direction indicated by boom arrows 122. The arm 110 is rotatably coupled to the boom 108. The arm 110 rotates about an arm axis 124 in the direction indicated by arm arrows 126. The attachment 112 is shown as a bucket which is rotatably coupled to the arm 110. The attachment 112 rotates about an attachment axis 128, in the direction indicated by attachment arrows 130. As shown in FIG. 1, the attachment 112 is a bucket; however, the attachment 112 may be a wide variety of other attachments. For example, the attachment 112 may be a bucket, a grapple, an auger, a jackhammer, a trench digger, a compacter, a shear, a clam, a forestry head, a thumb, etc. FIG. 1 also shows that the work vehicle 100 includes a blade 114 that is movably coupled to the lower frame of the work vehicle 100 to rotate about a blade axis 132, in the direction indicated by blade arrows 134. The blade 114 can be raised or lowered relative to the lower frame of the work vehicle 100 by controlling an actuator.

In an example operation, an operator in the operator compartment 102 can raise the boom 108 by controlling an actuator to rotate the boom 108 counterclockwise about the boom axis 120. The operator can control actuators 201 to rotate the arm 110 clockwise about the arm axis 124 and to rotate the attachment 112 clockwise about the attachment axis 128. Each of the plurality of actuators 201 is part of a closed-loop hydraulic system 200 that, upon receiving a command from the operator, moves hydraulic fluid to and from the actuator associated with the operator's intent.

To command the actuators 201 that drive movement of the movable elements 105 of the work vehicle 100, the operator may utilize an operator input system 302 of the control system 300. The operator input system 302 may comprise a variety of different mechanisms that an operator may interact with to control and manipulate the work vehicle 100. For example, the operator input system 302 may include joysticks, levers, pedals, buttons, a display screen, touch sensitive display elements, other visual, audio and haptic systems, among others. In addition, the operator input system 302 may include a microphone, where speech recognition components are included.

The efficiency with which each of the actuators 201 drives the intended movement is limited by physical constraints of the hydraulic system 200 and the work vehicle 100 generally, for example, the total fluid volume within the hydraulic system 200. A system described in greater detail below can optimize the movement of the movable elements 105 by managing hydraulic fluid flow sharing within the hydraulic system 200 to prioritize a fluid demand subsystem of the hydraulic system 200.

Figure 2:
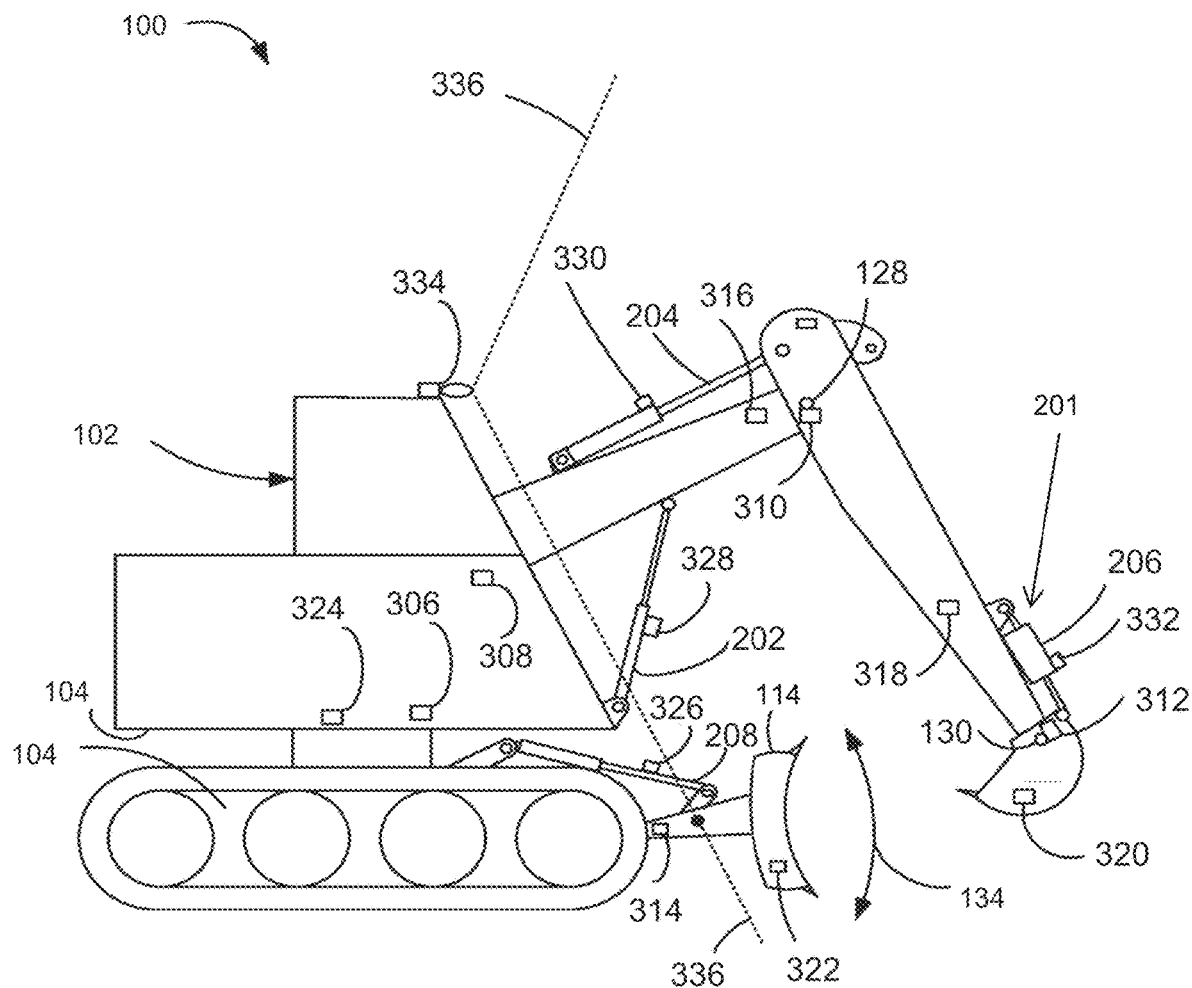
FIG. 2 is a side view of the exemplary work vehicle of FIG. 1.

Turning now to FIG. 2, the hydraulic system 200 will now be described in detail. The work vehicle 100 comprises a closed-loop hydraulic system 200 configured to drive movement of a plurality of movable elements 105 of the work vehicle 100. The hydraulic system 200 comprises a volume of hydraulic fluid, a plurality of actuators 201 each configured to drive movement of at least one of the movable elements 105 relative to the lower frame of the work vehicle 100, a plurality of valves each corresponding to at least one actuator, and a plurality of pumps each operably coupled to at least one actuator to controllably provide hydraulic fluid under pressure to the at least one actuator through the corresponding valve. To provide power to the plurality of pumps, each pump is in communication with the engine of the work vehicle 100.

The volume of hydraulic fluid of the closed-loop hydraulic system 200 is substantially fixed. The hydraulic fluid may be distributed throughout the hydraulic system 200 depending on the state of work vehicle 100. For example, in an inactive mode (e.g., travelling), the hydraulic fluid may be substantially stored in a hydraulic fluid reservoir or accumulator. Alternatively, when the work vehicle 100 is in use, the hydraulic fluid may be distributed to at least one hydraulic actuator to drive movement of a corresponding movable element.

The plurality of pumps are illustratively used to pump the hydraulic fluid (e.g., to pressurize it) and provide the hydraulic fluid to the plurality of valves. Each valve may be any valve capable of having at least an operable open/closed position, for example, a pilot input valve, a solenoid valve, etc. To further control the hydraulic fluid flow and pressure, a valve in an open position may be fully open or partially open. When a valve of the plurality of valves is opened, the opened valve allows hydraulic fluid to be provided under pressure from at least one pump of the plurality of pumps to at least one actuator of the plurality of actuators 201, thereby enabling the at the least one actuator to perform its designated functions or operations. For instance, when a valve corresponding to an actuator corresponding to the boom 108 is opened, hydraulic fluid is provided under pressure to the same actuator to extend or retract and drive movement of the boom 108. The same is true for actuators 201 corresponding to the arm 110, attachment 112, blade 114, etc.

FIG. 2 is a side view of another example work vehicle 100 and illustrates each actuator of the plurality of actuators 201 corresponding to the movable elements 105. For example, FIG. 2 shows an example boom actuator 202 that can be extended to raise the boom 108 and retracted to lower the boom 108 in relation to the lower frame of the work vehicle 100. An arm actuator 204 can be extended and retracted to pivot the arm 110 about the arm axis 124. An attachment actuator 206 can be extended and retracted to pivot the attachment 112 about the attachment axis 128. FIG. 2 also shows that a blade actuator 208 can be extended and retracted to lower and raise the blade 114 generally in the direction indicated by blade arrows 134. Each actuator of the plurality of actuators 201 may be a hydraulic piston, for example, a hydraulic double-acting cylinder piston.

The hydraulic system 200 further comprises a plurality of fluid demand subsystems, each fluid demand subsystem being associated with at least one actuator of the plurality of actuators 201, at least one valve of the plurality of valves, and at least once pump of the plurality of pumps. Each fluid demand subsystem may be configured to perform of an intended operation of the work vehicle 100. For example, a first fluid demand subsystem may be configured to operate the attachment 112, such as a bucket, of the work vehicle 100, and may comprise the attachment actuator 206, a first valve, and a first pump. Similarly, a second fluid demand subsystem may be configured to operate the boom 108 of the work vehicle 100, and may comprise the boom actuator 202, a second valve, and a second pump. Alternatively, the boom 108 and the attachment 112 of the work vehicle 100 may be operated simultaneously or substantially simultaneously. In such an implementation, a third fluid demand subsystem may comprise both the boom actuator 202 and the attachment actuator 206, the second valve, and either the first or second pump. It will be appreciated that the third fluid demand subsystem may comprise any combination of components of the first and second subsystems. It will also be appreciated that a fluid demand subsystem configured to operate a plurality of movable elements 105 of the work vehicle 100 may be a combination of the components of one or more fluid demand subsystems, the one or more subsystems each being configured to drive movement of one or more of the movable elements 105 of the work vehicle 100.

FIG. 2 also shows a sensor array 304 that can be deployed on the work vehicle 100 as part of the control system 300. Each sensor of the sensor array 304 may be associated with one of the movable elements 105 or hydraulic component to which the sensor is deployed. For example, a first sensor 306 of the sensor array 304 can be coupled to a linkage between the cab 106 and the lower frame of the work vehicle 100 that supports the tracks 104. The first sensor 306 can generate a signal indicative of a rotary position of the cab 106 relative to the lower frame of the work vehicle 100. Thus, the first sensor 306 may be a potentiometer, an angle encoder, or another sensor that measures the rotary position of the cab 106 relative to the lower frame of the work vehicle 100.

A second sensor 308 of the sensor array 304 is illustratively coupled to a linkage between the boom 108 and the upper frame which supports the cab 106 to measure the position of the boom 108 relative to the cab 106. For instance, the second sensor 308 can be a potentiometer or an angle encoder or another sensor that measures the angle of rotation of the boom 108 about the boom axis 120. A third sensor 310 of the sensor array 304 is illustratively coupled to a linkage between the boom 108 and the arm 110. The third sensor 310 illustratively measures the position of the arm 110 relative to the boom 108. A fourth sensor 312 of the sensor array 304 is coupled to a linkage between the arm 110 and the attachment 112. The fourth sensor 312 generates a signal indicative of the position of the attachment 112 relative to the arm 110. Similarly, a fifth sensor 314 of the sensor array 304 is coupled to a linkage between the blade 114 and the lower frame of the work vehicle 100 to measure the position of the blade 114 relative to the lower frame.

In addition to, or instead of the sensors 306-314, the sensor array 304 may have sensors 316-324 which may be inertial measurement units (IMUs) that track inertia, acceleration, and rotation of the movable elements 105 to which they are mounted. Then, using kinematic information (for example), the position or movement of the movable elements 105 can be mathematically calculated if the IMU is placed in a known position on one of the movable elements 105. In addition, or instead, the sensor array 304 may also have sensors 326-332. Sensors 326-332 may be linear displacement transducers (LDTs), such as magnetic resistive transducers, Hall Effect sensors, etc., that are coupled to a corresponding hydraulic actuator of the plurality of actuators 201 that drive movement of the different moveable elements. For example, a sensor 326 is coupled to the actuator 146 that actuates movement of the blade 114 relative to the lower frame of the work vehicle 100. The sensor 326 generates a signal indicative of the extent to which a cylinder of the blade actuator 208 is extended and is thus indicative of the position of the blade 114 relative to the lower frame of work vehicle 100. A sensor 328 can similarly detect the extent to which a cylinder of the boom actuator 202 is extended. A sensor 330 can detect the extent to which a cylinder of the arm actuator 204 is extended, and a sensor 332 can detect the extent to which a cylinder of the attachment actuator 206 is extended. Based upon these detected measurements, and based on other kinematic information, the location and velocity data of the movable elements 105 driven by the corresponding actuators 201 can be generated as well.

Similarly, FIG. 2 shows that the sensor array 304 can have a sensor 334 which may be a camera (a stereo camera or mono camera), a laser-based sensor, a RADAR or LIDAR-based sensor, or a similar type of sensor along with its corresponding image processing logic or other sensor signal detection and processing logic. These types of sensors have a line of sight or field of view, an example of which is indicated by dashed lines 336 in FIG. 2. The field of view of sensor 334 is a region in which the sensor 334 can generate a signal indicative of a position of a component within its field of view defined by lines 336. For example, a camera can visually capture an image of the blade 114. Processing logic can then identify the position of the blade 114 in the image so the position of the blade 114 relative to other moveable elements, such as relative to the boom 108, the attachment 112, etc. can be calculated. The sensor 334 and the processing logic can identify the location of other movable elements 105 as well.

Figure 3:
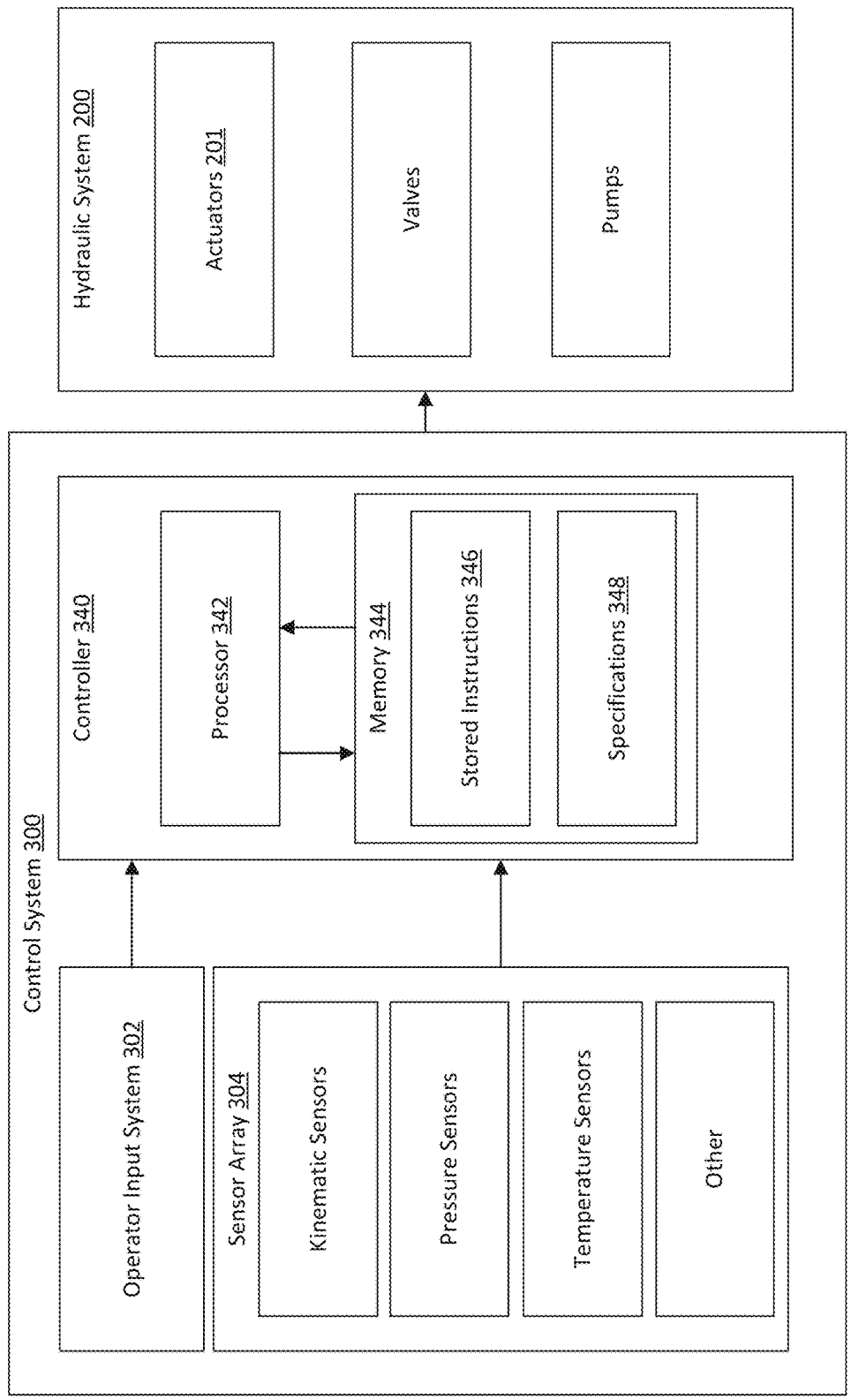
FIG. 3 is a block diagram showing the connectivity of an exemplary control system for operating the work vehicle of FIG. 1.
Figure 4:
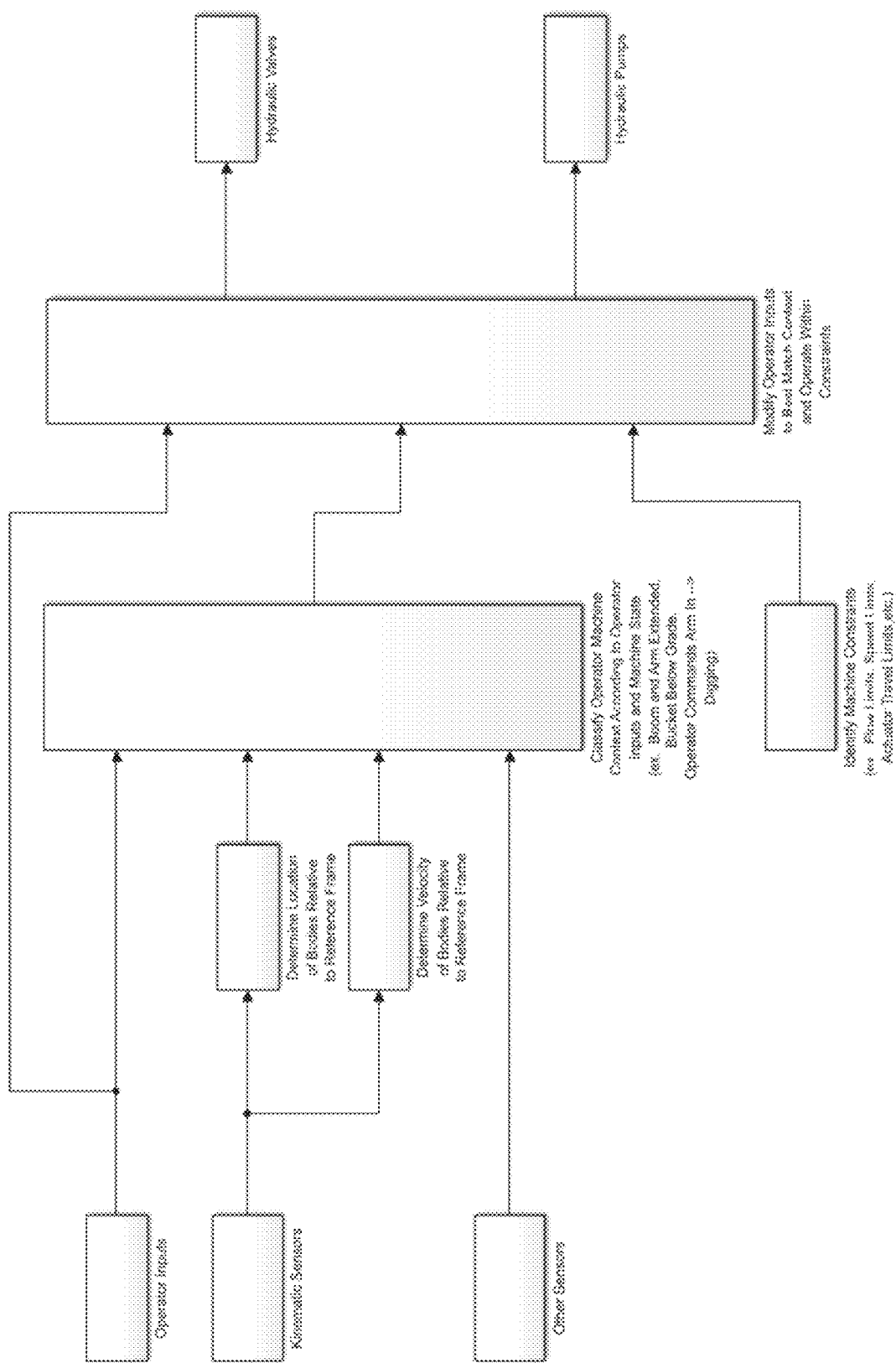
FIG. 4 illustrates a flow diagram showing one example of the operation of the work vehicle of FIG. 1.
Figure 5:
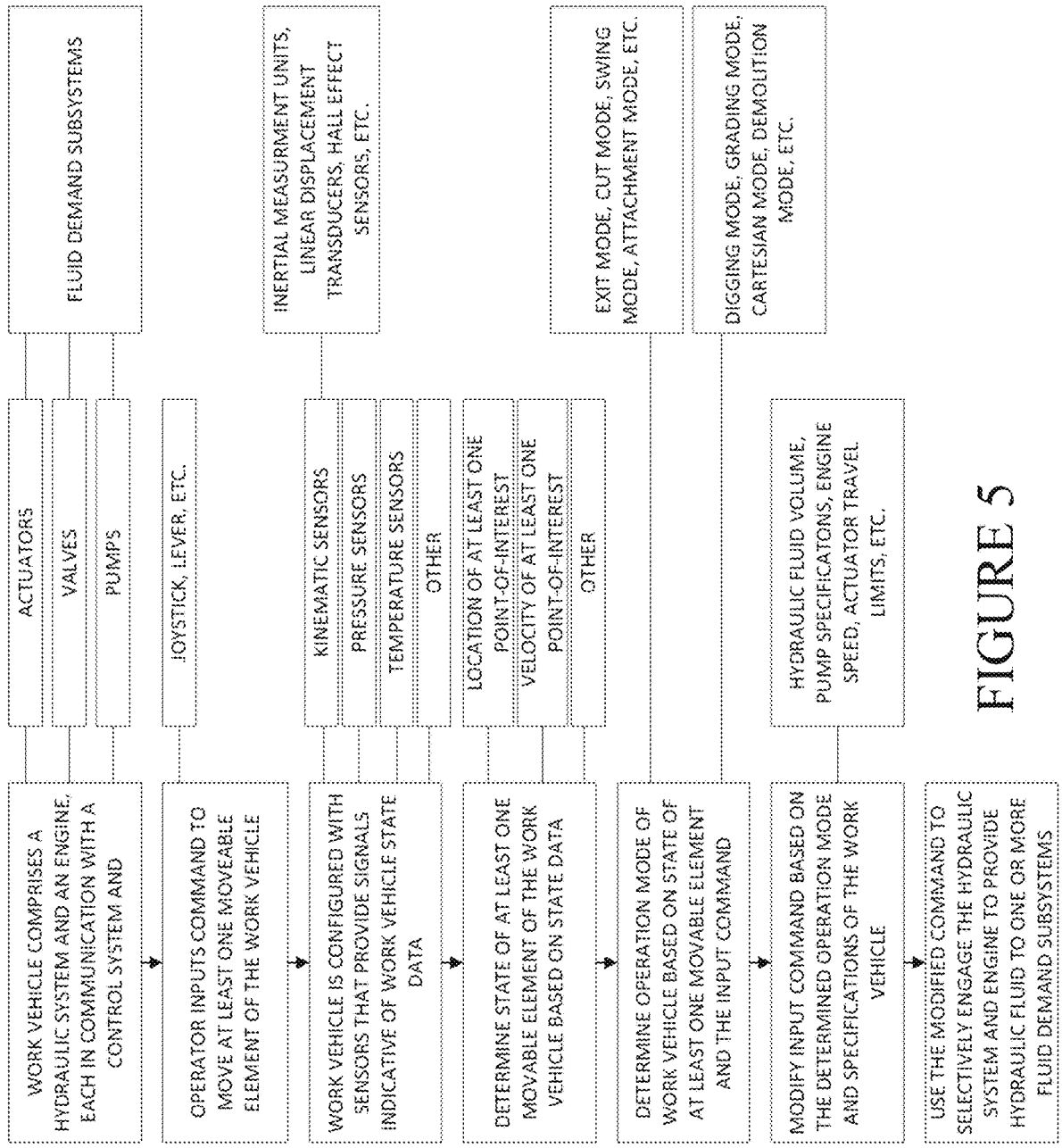
FIG. 5 is a block diagram showing another example of the operation of the work vehicle of FIG. 1.

Turning now to FIGS. 3-5, the control system 300 for optimizing performance of the hydraulic system 200 of the work vehicle 100 will be described in detail. A shown in FIG. 3 The control system 300 comprises an operator input system 302 for receiving an input command from an operator of the work vehicle 100, a sensor array 304 for receiving data relating to one or more movable elements 105 of the work vehicle 100, and a controller 340 comprising a processor 342 and a memory 244 for receiving, processing, and manipulating the input command and state data. The control system 300 is in communication with the hydraulic system 200 of the work vehicle 100 to direct hydraulic fluid flow throughout the hydraulic system 200 and drive movement of the movable elements 105 of the work vehicle 100.

As shown in FIGS. 4 and 5, the control system 300 comprises an operator input system 302 to drive movement of one or more movable elements 105 of the work vehicle 100 along a trajectory-of-action in accordance with an operator's intent. An operator may interact with a mechanism of the operator input system 302 to generate an input command, the input command being a signal indicative of the operator's intent. For example, the operator input system 302 may include a lever associated with the attachment 112 (e.g., a bucket) of the work vehicle 100. The lever may be configured such that if the operator engages the lever, the operator's intent to move the bucket along a trajectory-of-action is translated into an input command generated by the operator input system 302. The input command is then communicated to the controller 340 of the control system 300 to be processed, manipulated, and implemented.

The control system 300 further comprises a sensor array 304 to generate signals indicative of state data of the work vehicle 100. The sensor array 304 may comprise kinematic sensors configured to generate signals indicative of location data, position data, and velocity data of one or more movable elements 105 of the work vehicle 100 and/or of the actuators 201 of the hydraulic system 200. In another implementation, the sensor array 304 may further comprise pressure sensors configured to generate signals indicative of the pressure within the hydraulic system 200 proximate one or more of the movable elements 105, temperature sensors configured to generate signals indicative of the temperature of the hydraulic system 200 proximate one or more of the movable elements 105, load sensors configured to generate signals indicative of the load on the movable elements 105, hydraulic flow meters to generate signals indicative of hydraulic fluid flow within the hydraulic system 200, etc. The signals indicative of the state data of the work vehicle 100 is then communicated to the controller 340 of the control system 300 to be processed.

The controller 340 of the control system 300 comprises a processor 342 for processing data and stored instructions 346, and memory 344 comprising stored instructions 346 and specifications 348 of the work vehicle 100. The stored instructions 346, when executed by the processor 342, are configured to determine the state of the work vehicle 100 according to the state data. For example, in an implementation, the stored instructions 346 may be configured to determine the location of the movable element corresponding to the signal indicative of the location data provided by the sensor array 304, and further configured to determine the velocity of the movable element corresponding to the signal indicative of the velocity data provided by the sensor array 304. In another implementation, the stored instructions 346 may be configured to determine the pressure and/or temperature of the hydraulic system 200 proximate the movable element corresponding to the signal indicative of the pressure or temperature data, respectively. In yet another implementation, the stored instructions 346 may be further configured to determine the load on the movable element corresponding to the signal indicative of the load data.

The stored instructions 346, when executed by the processor 342, are further configured to determine an operation mode of the work vehicle 100 based at least upon the state of the work vehicle 100 and the input command. The operation modes of the work vehicle 100 may vary depending on the type of work vehicle 100 and the movements available to the work vehicle 100.

For example, in one implementation, the work vehicle 100 may be an excavator having operation modes relating to a movement, comprising one or more of an exit or lift mode, a cut or turn mode, a swing or extend and retract mode, and an attachment or auxiliary priority mode. In a further implementation, the controller 340 may be configured to receive signals indicative of location data and velocity data of the boom 108, arm 110, and attachment 112 of the work vehicle 100, and the stored instructions 346 may be configured to determine the location and velocity of each of the boom 108, arm 110, and attachment 112 based on the location data and velocity data of the same. In an implementation, the stored instructions 346 may determine that the work vehicle is in an exit mode when the attachment 112 is located at or below a grade level, when the operator generates an input command to raise the attachment 112 at least by extending the boom actuator 202 and/or retracting the arm actuator 204, and/or when the attachment 112 is determined not to be swinging.

In another implementation, the work vehicle may be an excavator having operation modes relating to a task, such as a digging mode, a grading mode, a Cartesian mode, and a demolition mode. In a further implementation, the stored instructions 346 may determine that the work vehicle 100 is in a digging mode when the boom 108 is determined to be extended, the arm 110 is determined to be extended, the attachment 112 is determined to be located below a grade level, and the operator generates an input command to move the arm 110 inwards toward the lower frame of the work vehicle 100.

The stored instructions 346, when executed by the processor 342, are further configured to generate a modified command to drive movement of one or more movable elements 105 based at least upon the determined operation mode and the specifications 348 of the work vehicle 100. The specifications 348 of the work vehicle 100, which may be stored in the memory 344 of the controller 340 and configured to be accessed by the processor 342, comprise one or more of the volume of hydraulic fluid of the hydraulic system 200, output parameters of each of the plurality of pumps (e.g., hydraulic fluid flow rates) of the hydraulic system 200, actuation amplitude of each of the plurality of actuators 201 of the hydraulic system 200, and speed limits of the engine of the work vehicle 100.

Upon accessing and processing the specifications 348 of the work vehicle 100, the input command, the determined operation mode, the stored instructions 346 are further configured to generate the modified command to be implemented to drive movement of the one or more movable elements 105 of the work vehicle 100 intended to be moved by the operator. The modified command is configured to drive movement of the one or more movable elements 105 within the specifications 348 of the work vehicle 100 and in accordance with the context within which the work vehicle 100 is being used. In one implementation, the context within which the work vehicle 100 is being used correlates to the determined operation mode. For example, when the work vehicle 100 is determined to be in an exit mode, the work vehicle 100 may be being used to lift a load out of a trench or other position. In another example, when the work vehicle 100 is determined to be in a digging mode, the work vehicle 100 may be being used to dig.

The modified command may then be used to selectively provide hydraulic fluid flow to one or more selected fluid demand subsystems of the hydraulic system 200 and enable the hydraulic system 200 to drive movement of one or more movable elements 105 of the work vehicle 100. To selectively provide hydraulic fluid to the selected one or more fluid demand subsystems, the modified command may open or close one or more of the plurality of valves of the hydraulic system 200, selectively engage one or more of the plurality of pumps of the hydraulic system 200, adjust the speed of the engine of the work vehicle 100, or a combination of the same. For example, to engage one or more actuators 201 of a selected fluid demand subsystem, the modified command may open or close one or more of the plurality of valves of the hydraulic system 200. In another example, one or more actuators 201 of a selected fluid demand subsystem may be engaged by opening or closing one or more of the plurality of valves of the hydraulic system 200 and selectively engaging one or more of the plurality of pumps of the hydraulic system 200. In yet another example, one or more actuators 201 of a selected fluid demand subsystem may be engaged by selectively engaging one or more of the plurality of pumps of the hydraulic system 200.

By selectively providing hydraulic fluid flow to one or more selected fluid demand subsystems, the actuators 201 associated with the one or more identified fluid demand subsystems may be prioritized. Because the actuators 201 drive movement of associated movable elements 105 of the work vehicle 100 depending on the hydraulic fluid provided to or redirected from the actuators 201, the cycle time of each actuator may be dependent at least upon the volume of hydraulic fluid available to be provided to the actuator, as well as the rate at which the hydraulic fluid may be provided therein. By using the modified command to selectively provide hydraulic fluid flow to one or more selected fluid demand subsystems, the distribution of hydraulic fluid, output from the engine of the work vehicle 100, and output from each pump corresponding to the identified one or more fluid demand subsystems may be controlled to prioritize output of the one or more actuators 201 associated with the one or more identified fluid demand subsystems.

As a result of prioritizing the output of the one or more actuators 201 associated with the one or more selected fluid demand subsystems, the cycle time of each of the one or more actuators 201 may be reduced. By reducing the cycle time of each of the one or more actuators 201, the efficiency of the work vehicle 100 as a whole may be improved. For example, by reducing cycle time, the work vehicle 100 may execute the operations associated with operator's intent in less time and with greater efficiency, thereby improving fuel efficiency of the work vehicle 100 and improving the speed at which the operations may be completed. This increased efficiency may be targeted to individual movements of a work vehicle 100 by defining operation modes and fluid demand subsystems according to each movement available to an operator of the work vehicle 100 such an exit mode, a cut mode, a swing mode, and an attachment mode. When running at least between an exit mode, a cut mode, a swing mode, and an attachment mode, the hydraulic fluid share of the closed-loop hydraulic system 200 maybe adjusted as an operator commands the work vehicle 100 through a cycle of the movements.

Alternatively and in another implementation, the increased efficiency may be targeted to general operations by defining operation modes and fluid demand subsystems according to tasks available to an operator of the work vehicle 100 such as a digging mode, a grading mode, a Cartesian mode, and a demolition mode.

In an implementation, the operator may engage a joystick of the operator input system 302 with the intent to move the arm 110 inwards toward the lower frame of the work vehicle 100. Upon receiving signals indicative of state data from the sensor array 304, and receiving the input command from the operator input system 302, the controller 340 may determine the location and velocity of the boom 108, arm 110, and attachment 112 of the work vehicle 100, and determine the operation mode of the work vehicle 100 to be a digging mode. Based on the determined digging mode, the input command, and the specifications 348 of the work vehicle 100, the controller 340 may generate a modified command configured to select a fluid demand subsystem associated with the arm actuator 204 and the attachment actuator 206. The modified command may provide hydraulic fluid to the arm actuator 204 and attachment actuator 206 by limiting hydraulic fluid flow to the boom actuator 202 and attachment actuator 206 to flow through a single valve of the plurality of valves thereby preventing hydraulic fluid flow to the boom 108. The modified command may further engage two pumps of the plurality of pumps, each pump being configured to provide hydraulic fluid to the selected fluid demand subsystem and being further configured to operate at a max speed when max flow is commanded by the input command. Further, the modified command, when based on a determined digging mode, may be implemented to adjust the engine speed control to be based on the actual hydraulic fluid flow as opposed to commanded fluid flow, such as by adjusting the max engine speed corresponding to the physical throttle position.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A control system for optimizing performance of a hydraulic system of a work vehicle, comprising:
   one or more actuators configured to drive movement of a movable element of the work vehicle;
   a plurality of fluid demand subsystems of the hydraulic system configured to receive hydraulic fluid during operation of the hydraulic system, wherein each fluid demand subsystem comprises at least one of the one or more actuators; and
   a controller receiving:
      location data of the movable element;
      velocity data of the movable element; and
      an input command to move the movable element along a trajectory-of-action;
   wherein the controller comprises:
      a processor for processing data and instructions; and
      memory comprising stored instructions, the stored instructions, when executed by the processor configured to:
         locate the movable element based on the location data;
         determine a velocity of the movable element based on the velocity data;
         determine an operation mode based at least upon the location of the movable element, the velocity of the movable element, and the input command;
         generate a modified command based at least upon a work vehicle specification and the determined operation mode; and
         selectively provide hydraulic fluid flow to one or more of the plurality of fluid demand subsystems based at least upon the modified command to prioritize output of the one or more actuators corresponding to the one or more fluid demand subsystems, and drive movement of the movable element along the trajectory-of-action.

2. The control system according to claim 1, wherein the one or more actuators includes a plurality of actuators, and wherein the hydraulic system comprises:
   a plurality of valves each corresponding to at least one actuator of the plurality of actuators; and
   a plurality of pumps each operably coupled to at least one actuator of the plurality of actuators to controllably provide hydraulic fluid under pressure to the at least one actuator through each corresponding valve of the plurality of valves.

3. The control system according to claim 2, wherein a first fluid demand subsystem comprises a first actuator, wherein a second fluid demand subsystem comprises a second actuator, and wherein a third fluid demand subsystem comprises the first actuator.

4. The control system according to claim 2, wherein selectively providing hydraulic fluid flow based on a first modified command results in a first valve of the plurality of valves being open and a second valve of the plurality of valves being closed such that hydraulic fluid is provided to a first fluid demand subsystem, and selectively providing hydraulic fluid flow based on a second modified command results in the first valve of the plurality of valves being closed and the second valve of the plurality of valves being open such that hydraulic fluid is provided to a second fluid demand subsystem.

5. The control system according to claim 2, wherein the work vehicle specification comprises one or more of:
   hydraulic fluid volume of the hydraulic system;
   actuation amplitude of each of the plurality of actuators;
   output parameters of each of the plurality of pumps; and
   engine speed limits.

6. The control system according to claim 1, wherein the stored instructions, when executed by the processor, are further configured to select a fluid demand subsystem of the plurality of fluid demand subsystems, the selected fluid demand subsystem comprising an actuator of the one or more actuators corresponding to a moveable element of the vehicle being commanded to be moved along the trajectory-of-action based on the input command.

7. The control system according to claim 6, wherein a cycle time of the actuator of the selected fluid demand subsystem, upon the selected fluid demand subsystem being provided hydraulic fluid based on the modified command, is less than a cycle time of the actuator upon being engaged based on the input command.

8. The control system according to claim 1, wherein the controller is further configured to receive location data of a plurality of movable elements of the work vehicle, and velocity data of the plurality of movable elements;
   wherein the stored instructions, when executed by the processor are further configured to locate the plurality of movable elements based on the location data, determine a velocity of each of the plurality of movable elements based on the velocity data; and determine an operation mode according to the location of each of the plurality of movable elements, the velocity of each of the plurality of movable elements, and the input command.

9. The control system according to claim 1, wherein the controller is further configured to receive state data, the state data comprising one or more of:
pressure data of the hydraulic system proximate the movable element;
temperature data of the hydraulic system proximate the movable element; and
load data of the work vehicle proximate the movable element;
wherein the stored instructions, when executed by the processor are further configured to determine a state of the work vehicle based on the state data, and wherein the operation mode is determined according to the state of the work vehicle, the location of the movable element, the velocity of the movable element, and the input command.

10. The control system according to claim 1, wherein the work vehicle is an excavator.

11. The control system according to claim 10, wherein the determined operation mode comprises one or more of:
an exit mode;
a cut mode;
a swing mode;
a Cartesian mode;
a transport mode;
a grading mode; and
an attachment mode.

12. The control system according to claim 1, further comprising a sensor array configured to generate location data of the movable element and velocity data of the movable element, and further configured to send the location data and the velocity data to the controller.

13. The control system according to claim 12, wherein the sensor array comprises one or more of:
kinematic sensors;
inertial measurement units;
linear displacement transducers;
Hall effect sensors;
rotation sensors;
accelerometers;
optical sensors;
laser-based sensors;
hydraulic pressure sensors; and
hydraulic flow meters.

14. The control system according to claim 1, further comprising an operator input system configured to generate the input command based on operator input, the operator input system comprising one or more of:
a graphical user interface;
a lever;
a joystick; and
a pedal.

15. A method of controlling a hydraulic system of a work vehicle comprising:
locating a movable element of the work vehicle;
determining a velocity of the movable element along a trajectory-of-action;
receiving an input command to move the movable element along a trajectory-of-action;
determining an operation mode based at least upon the location of the movable element, the velocity of the movable element, and the input command;
accessing a work vehicle specification;
modifying the input command according to the work vehicle specification and the operation mode; and
using the modified command to provide hydraulic fluid flow to a fluid demand subsystem of the hydraulic system and drive movement of the movable element along the trajectory-of-action.

16. The method according to claim 15, further comprising selecting an actuator corresponding to the fluid demand subsystem, the selected actuator being configured to drive movement of the movable element of the work vehicle along the trajectory-of-action.

17. The method according to claim 16, wherein a cycle time of the selected actuator upon using the modified command to provide hydraulic fluid flow to the fluid demand subsystem is less than a cycle time of the selected actuator upon being engaged based on the input command.

18. The method according to claim 15, wherein the hydraulic system comprises:
a plurality of actuators configured to drive movement of a movable element of a plurality of movable elements;
a plurality of valves each corresponding to at least one actuator of the plurality of actuators;
a plurality of pumps each operably coupled to at least one actuator of the plurality of actuators to controllably provide hydraulic fluid under pressure to the at least one actuator through the corresponding valve; and
a plurality of fluid demand subsystems configured to receive hydraulic fluid during operation of the hydraulic system, wherein each fluid demand subsystem comprises an actuator of the plurality of actuators.

19. The method according to claim 18, wherein using a first modified command to provide hydraulic fluid flow results in a first valve being open and a second valve being closed such that a first fluid demand subsystem is provided hydraulic fluid, and using a second modified command to provide hydraulic fluid results in the first valve being closed and the second valve being open such that a second fluid demand subsystem is provided hydraulic fluid.

20. A work vehicle comprising:
a frame;
a plurality of movable elements mounted to the frame;
a hydraulic system comprising:
a plurality of actuators configured to drive movement of the plurality of movable elements;
a plurality of valves each corresponding to at least one actuator of the plurality of actuators;
a plurality of pumps each operably coupled to at least one actuator of the plurality of actuators to controllably provide hydraulic fluid under pressure to the actuator through the corresponding valve; and
a plurality of fluid demand subsystems each configured to receive hydraulic fluid during operation of the hydraulic system, wherein each fluid demand subsystem comprises an actuator of the plurality of actuators;
a sensor array configured to collect location data of the plurality of movable elements, and further configured to collect velocity data of the plurality of movable elements; and
an operator input system configured to receive an input command to move a moveable element of the plurality of movable elements along a trajectory-of-action;

a controller in communication with the hydraulic system, the sensor array, and the input command processor, the controller configured to:
locate the moveable element of the plurality of movable elements based on the location data;
determine a velocity of the moveable element of the plurality of movable elements based on the velocity data;
determine an operation mode according to the location of the moveable element of the plurality of movable elements, the velocity of the moveable element of the plurality of movable elements, and the input command;
generate a modified command according to a work vehicle specification and the determined operation mode; and
selectively provide hydraulic fluid flow to one or more of the plurality of fluid demand subsystems based at least upon the modified command to prioritize output of one or more of the plurality of actuators of the one or more prioritized fluid demand subsystems, and drive movement of the movable element along the trajectory-of-action.

* * * * *